United States Patent
Lin et al.

(10) Patent No.: US 9,770,997 B2
(45) Date of Patent: Sep. 26, 2017

(54) DETECTION OF IMBALANCE ACROSS MULTIPLE BATTERY CELLS MEASURED BY THE SAME VOLTAGE SENSOR

(71) Applicant: Ford Global Technologies, LLC, Dearborn, MI (US)

(72) Inventors: Xinfan Lin, Ann Arbor, MI (US); Anna Stefanopoulou, Ann Arbor, MI (US); Richard Dyche Anderson, Plymouth, MI (US); Yonghua Li, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 719 days.

(21) Appl. No.: 13/914,857

(22) Filed: Jun. 11, 2013

(65) Prior Publication Data

US 2014/0361743 A1 Dec. 11, 2014

(51) Int. Cl.
*H02J 7/00* (2006.01)
*B60L 11/18* (2006.01)

(52) U.S. Cl.
CPC ....... *B60L 11/1866* (2013.01); *B60L 11/1861* (2013.01); *H02J 7/0014* (2013.01); *H02J 7/0021* (2013.01); *B60L 2240/545* (2013.01); *B60L 2240/547* (2013.01); *B60L 2240/549* (2013.01); *Y02T 10/7011* (2013.01); *Y02T 10/7044* (2013.01); *Y02T 10/7055* (2013.01); *Y02T 10/7061* (2013.01)

(58) Field of Classification Search
CPC .................................................... H02J 7/0016
USPC ................................................ 320/118, 119
See application file for complete search history.

(56) References Cited

U.S. PATENT DOCUMENTS

| 6,255,826 | B1 | 7/2001 | Ohsawa et al. |
| 6,285,163 | B1 * | 9/2001 | Watanabe et al. ............ 320/132 |
| 6,359,419 | B1 | 3/2002 | Verbrugge et al. |
| 7,193,391 | B2 | 3/2007 | Moore |
| 7,554,296 | B2 | 6/2009 | Mizuno et al. |
| 7,557,585 | B2 | 7/2009 | Yudahira |
| 7,710,120 | B2 | 5/2010 | Yudahira et al. |
| 2006/0001403 | A1 | 1/2006 | Yudahira |

(Continued)

FOREIGN PATENT DOCUMENTS

| DE | 102010039915 A1 | 3/2012 |
| WO | 2012098523 A2 | 7/2012 |

*Primary Examiner* — Edward Tso
*Assistant Examiner* — Ahmed Omar
(74) *Attorney, Agent, or Firm* — David Kelly; Brooks Kushman P.C.

(57) ABSTRACT

A vehicle having a battery pack with cells arranged in at least groups of two cells in series is disclosed. A controller balances the cells based on a change in voltage across the cells being different than an expected change in voltage. The expected value is based on a current and a time associated with charging or discharging the cells. A controller is disclosed that commands charging and discharging of the battery cells based on a difference between a voltage across the group and the expected value for the group. A method for charging and discharging a battery pack is disclosed. The voltage across a group of cells is measured and compared to an expected value. An imbalance in a cell attribute is estimated according to a difference between the measured voltage and the expected voltage. The voltage across each battery cell is not required.

18 Claims, 5 Drawing Sheets

(56) References Cited

U.S. PATENT DOCUMENTS

| | | | |
|---|---|---|---|
| 2006/0028179 A1* | 2/2006 | Yudahira et al. | 320/133 |
| 2009/0024338 A1* | 1/2009 | Suzuki | G01R 31/3651 702/63 |
| 2011/0025270 A1 | 2/2011 | Nakanishi | |
| 2014/0042973 A1* | 2/2014 | Kawahara | H01M 10/441 320/118 |
| 2015/0069973 A1* | 3/2015 | Yoshida | B60L 11/1864 320/118 |

* cited by examiner

DETECTION OF IMBALANCE ACROSS MULTIPLE BATTERY CELLS MEASURED BY THE SAME VOLTAGE SENSOR

TECHNICAL FIELD

This disclosure relates generally to detection of cell imbalances in a battery in which measurements of a cluster of cells are made.

BACKGROUND

Modern hybrid and electric vehicles utilize battery packs to provide energy for propulsion and for storing regenerated energy. Battery packs are typically composed of multiple individual battery cells that may be connected in parallel, series or some combination thereof. Battery packs may be based on several chemistries such as lead acid, nickel-metal hydride (NIMH) or Lithium-Ion. To prevent cell overcharging, a typical Lithium-Ion battery pack measures the voltage of each cell within the battery pack. Measuring the voltage across each battery cell may be expensive and require sophisticated processing devices in order to process the voltages effectively.

SUMMARY

A vehicle is disclosed comprised of battery cells arranged into groups of at least two. The vehicle also comprises a controller programmed to balance at least some of the cells in response to a change in voltage, caused by charging or discharging the cells, across one of the groups being different than an expected change in voltage. The expected change in voltage is based on a current and time associated with the charging and discharging. The controller may base the expected change in voltage on the voltage measured across the groups. The cells may be charged and discharged at a generally constant current. The cells may be lithium based.

A vehicle is disclosed comprised of battery cells arranged into groups of at least two. The vehicle also comprises a controller programmed to command charging and discharging of the battery cells within a group based on a difference between a measured voltage across the group and an expected voltage for the group. The expected voltage is based on a current and time associated with the charging and discharging. The charging may be commanded such that the voltage of each cell in the group does not exceed a predetermined voltage. The discharging may be commanded such that the voltage of each cell in the group remains above a predetermined voltage. The expected voltage may further be based on the voltage across the group for a predetermined amount of time beginning with vehicle activation. The cells may be charged or discharged at a generally constant current. The charging and discharging may be further based on an estimate of at least one of a state of charge and a charge capacity for the cells within the group calculated from the difference between the voltage across the group and the expected voltage for the group. The state of charge and charge capacity may be estimated when an average state of charge of the cells within the group is within a predetermined range of values. The battery cells may be lithium based.

A method for charging and discharging a battery pack is disclosed. A voltage across a group of battery cells is measured. An expected voltage based on a current and time associated with charging or discharging the cells is calculated. An imbalance in at least one cell attribute between the cells of the group is estimated based on a difference between the measured voltage and the expected voltage. The battery pack is charged and discharged in response to the imbalance estimation to reduce the imbalance in the cell attribute between the cells of the group. The expected voltage may be based on a value of the measured voltage for a predetermined amount of time beginning with vehicle activation. The expected voltage may be further based on the value of the measured voltage during a period of time beginning with vehicle activation and ending when the difference between the voltage and the expected voltage becomes less than a predetermined value. The at least one cell attribute may include a state of charge and a charge capacity. The at least one cell attribute may be estimated for each of the cells of the group.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
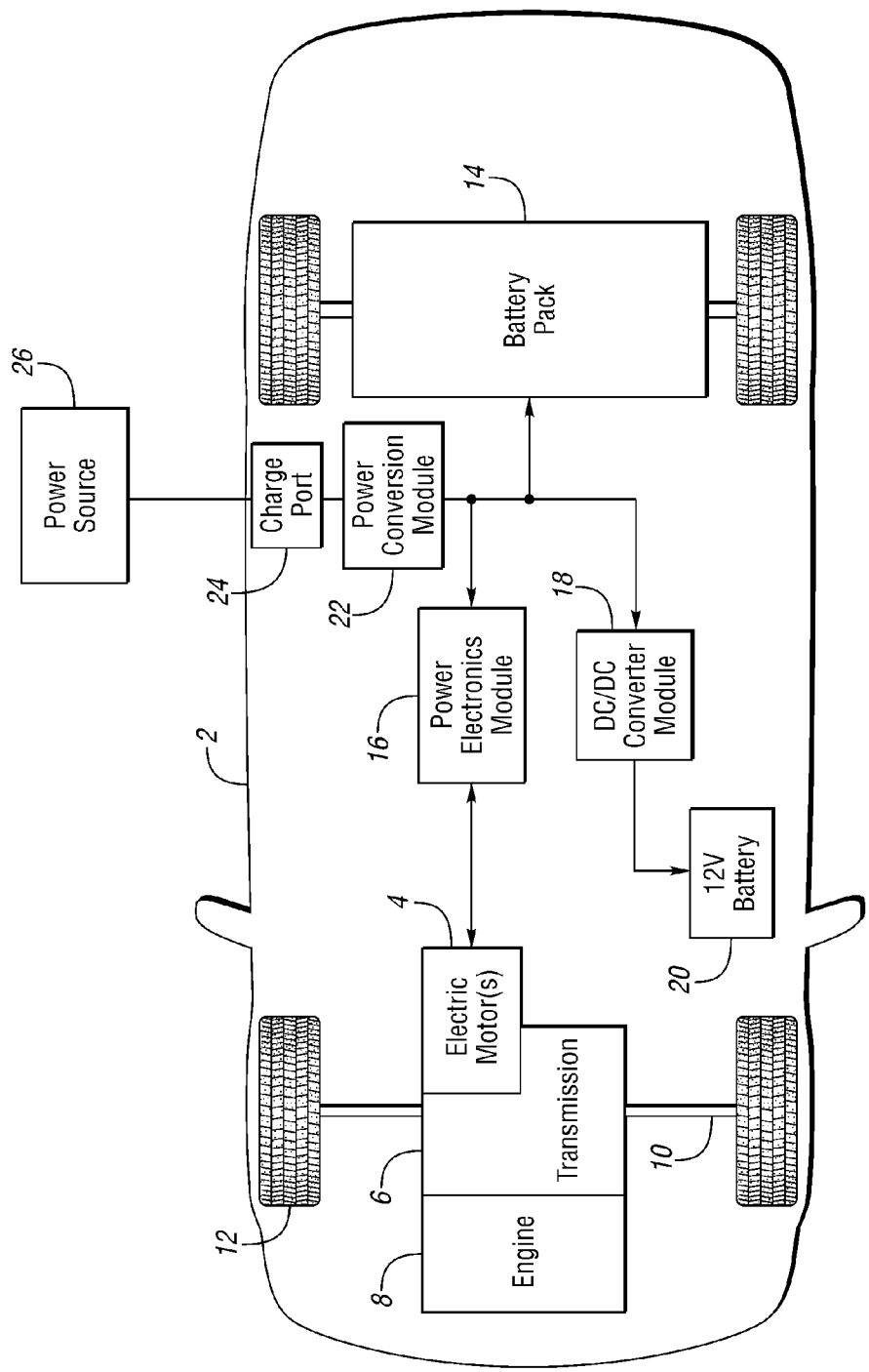
FIG. 1 is a diagram of a plug-in hybrid-electric vehicle that illustrates some typical drivetrain and energy storage components.

FIG. 1 depicts a typical plug-in hybrid-electric vehicle. A typical plug-in hybrid-electric vehicle 2 may comprise one or more electric motors 4 mechanically connected to a hybrid transmission 6. In addition, the hybrid transmission 6 is mechanically connected to an engine 8. The hybrid transmission 6 may also be mechanically connected to a drive shaft 10 that is mechanically connected to the wheels 12. The electric motors 4 can provide propulsion and deceleration capability when the engine 8 is turned on or off. The electric motors 4 may also act as generators and can provide fuel economy benefits by recovering energy that would normally be lost as heat in the friction braking system. The electric motors 4 may also reduce pollutant emissions since the hybrid electric vehicle 2 may be operated in electric mode under certain conditions.

The battery pack 14 stores energy that can be used by the electric motors 4. A vehicle battery pack 14 typically provides a high voltage DC output. The battery pack 14 is electrically connected to a power electronics module 16. The power electronics module 16 is also electrically connected to the electric motors 4 and provides the ability to bi-directionally transfer energy between the battery pack 14 and the electric motors 4. For example, a typical battery pack 14 may provide a DC voltage while the electric motors 4 may require a three-phase AC current to function. The power electronics module 16 may convert the DC voltage to a three-phase AC current as required by the electric motors 4. In a regenerative mode, the power electronics module 16 will convert the three-phase AC current from the electric motors 4 acting as generators to the DC voltage required by the battery pack 14. The methods described herein are equally applicable to a pure electric vehicle or any other device using a battery pack.

In addition to providing energy for propulsion, the battery pack 14 may provide energy for other vehicle electrical systems. A typical system may include a DC/DC converter module 18 that converts the high voltage DC output of the battery pack 14 to a low voltage DC supply that is compatible with other vehicle loads. Other high voltage loads, such as compressors and electric heaters, may be connected directly to the high-voltage bus from the battery pack 14. In a typical vehicle, the low voltage systems are electrically connected to a 12V battery 20. An all-electric vehicle may have a similar architecture but without the engine 8.

The battery pack 14 may be recharged by an external power source 26. The external power source 26 may provide AC or DC power to the vehicle 2 by electrically connecting through a charge port 24. The charge port 24 may be any type of port configured to transfer power from the external power source 26 to the vehicle 2. The charge port 24 may be electrically connected to a power conversion module 22. The power conversion module may condition the power from the external power source 26 to provide the proper voltage and current levels to the battery pack 14. In some applications, the external power source 26 may be configured to provide the proper voltage and current levels to the battery pack 14 and the power conversion module 22 may not be necessary. The functions of the power conversion module 22 may reside in the external power source 26 in some applications.

Figure 2:
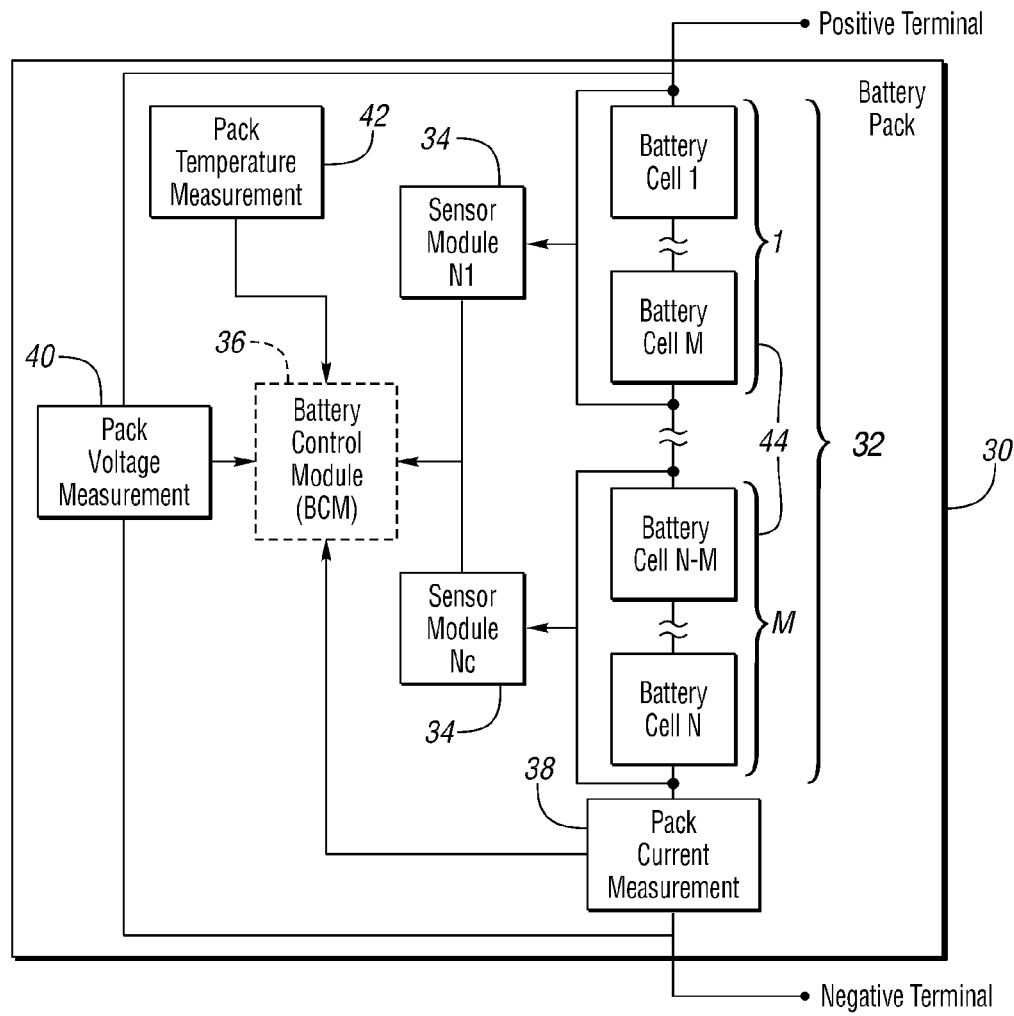
FIG. 2 is a diagram of a possible battery pack arrangement for a pack comprised of multiple cells and monitored and controlled by a Battery Control Module.

Battery packs may be constructed from a variety of chemical formulations. Typical battery pack chemistries are lead acid, nickel-metal hydride (NIMH) or Lithium-Ion. Within the Lithium-Ion family there may be a variety of different lithium-based formulations. FIG. 2 shows a typical battery pack 30 in a simple series configuration of N battery cells 32. Other battery packs, however, may be composed of any number of individual battery cells connected in series or parallel or some combination thereof. A typical system may have one or more controllers, such as a Battery Control Module (BCM) 36, that monitors and controls the performance of the battery pack 30. The BCM 36 may monitor battery pack level characteristics such as pack current 38, pack voltage 40 and pack temperature 42.

In addition to the pack level characteristics, there may be battery cell level characteristics that are measured and monitored. For example, the terminal voltage, current, and temperature of each cell 32 may be measured. Alternatively, these properties may be measured for a string or group of cells 44. Depending on the capabilities, the sensor module 34 may measure the characteristics of one or more of the battery cells 32. The sensor module 34 may also measure the characteristics of one or more strings or groups 44 of battery cells 32, where each string or group 44 is composed of multiple battery cells 32 that are electrically connected in series with one another. For example, a voltage measurement of a string or group 44 of battery cells 32 may be the total voltage across the group of battery cells connected in series. Each element of a string or group 44 of battery cells may actually be a number of battery cells 32 connected in parallel to one another. That is, instead of individual cells connected in series, there may be cells connected in parallel and then the parallel clusters may be connected in series.

The battery pack 30 may be composed of M groups 44 of battery cells 32. The battery pack 30 may utilize $N_c$ sensor modules 34 to measure the cell or group characteristics of all the battery cells 32 or groups 44. A sensor module 34 may measure the characteristics of one or more groups 44 of battery cells 32. Each sensor module 34 may be a separate controller. The functionality of the sensor modules 34 may also be incorporated into the BCM 36. The functionality of the sensor modules 34 may be distributed among one or more sensor modules 34 and the BCM 36. Each sensor module 34 may transfer the measurements to the BCM 36 for further processing and coordination. The sensor modules 34 may transfer signals in analog or digital form to the BCM 36.

The sensor module 34 may measure the voltage across one cell or across multiple battery cells 32. The battery cells 32 may be arranged in groups 44 such that a sensor module 34 may measure the voltage across the group of cells 44. A voltage measurement across multiple battery cells may also be referred to as a string or cluster voltage. FIG. 2 depicts the case where a group voltage is measured across M cells 44. A group of cells 44 is comprised of at least two battery cells 32 in connected in series. Measuring the group voltages has the advantage of reduced cost as fewer voltage measurement circuits may be needed. It may also reduce computation time as fewer voltages must be processed. However, for a lithium-ion battery pack it is important to know the status of each cell in order to prevent overcharging of the cells. Therefore, it may be important to ascertain individual cell characteristics from the group measurements.

Measuring the voltage across multiple battery cells has been used for NIMH and lead-acid batteries. In general, for these technology batteries, it is not necessary to measure the voltage across each cell. An important reason for measuring the voltage across each cell in a lithium-based battery pack is to prevent cell overcharging. One difference between the battery types is the detectability of an overcharging event. For a NIMH battery cluster, an overcharge situation may be detected by a change in temperature or voltage. At high state of charge (SOC) values, a NIMH battery cell may exhibit a voltage drop or temperature rise that can be used to detect when a cell is fully charged. This property may be used to stop charging the battery when the condition is detected. Since the overall voltage is the sum all of the cells in the cluster, a voltage drop in one of the cells will cause the overall voltage to drop.

Another difference between a NIMH battery and a lithium-based battery is the severity of the reaction to overcharging. A lithium-ion battery that is overcharged may create a thermal event that damages the battery. For this reason, knowing the status of each cell is very important in a lithium-ion battery pack. A lithium-ion battery cell may have built-in means of preventing damage due to overcharging. For safety, the built-in mechanisms may render a cell inoperable if an overcharging event is detected. The disadvantage of these built-in mechanisms is that they may render the battery pack permanently unusable once activated. It may be desirable to detect an overcharge situation before these built-in mechanisms are activated.

A NIMH battery controller may measure the voltage across a cluster of series connected NIMH cells. To determine the voltage of each cell, an average voltage value may be used. A NIMH battery may not be concerned with an accurate value of the actual voltage of each cell because the overcharge detection can be effectively determined from the cluster voltage value. In addition, some overcharging is acceptable as the impact of overcharging a cell is not as severe as in a lithium-ion pack.

Figure 4:
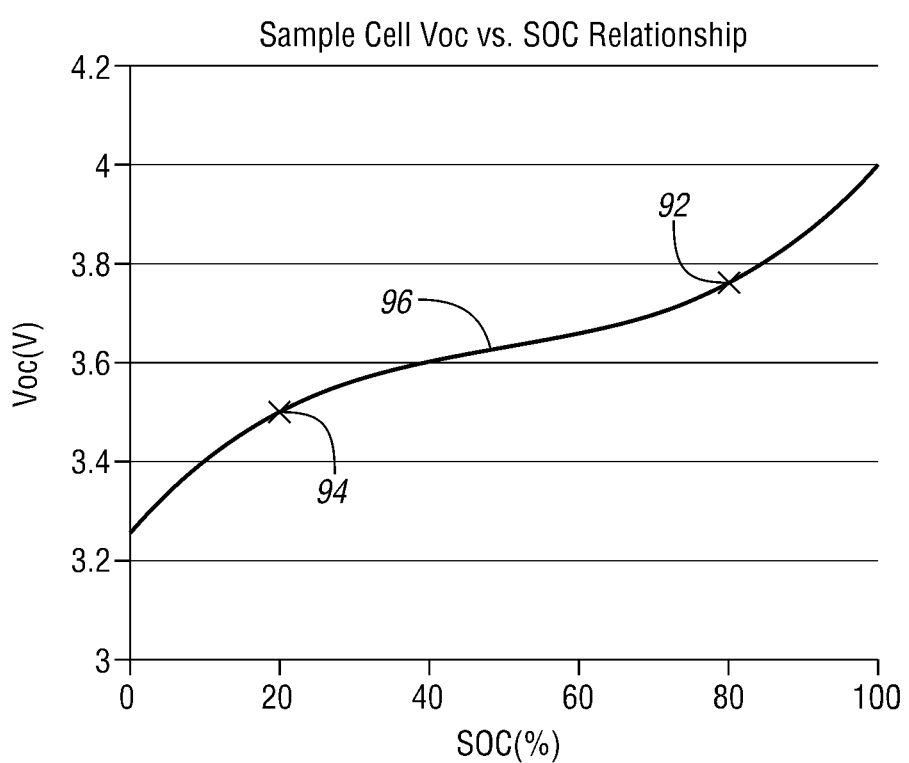
FIG. 4 is a graph that illustrates a possible open-circuit voltage (Voc) vs. battery state of charge (SOC) relationship for a typical battery cell.

For a lithium-ion battery pack, it is important to know the voltage and state of charge for each cell in a cluster or group to ensure that no cells are overcharged. Typically, each cell voltage is measured to ensure that a cell is not overcharged. Using an average based on the cluster voltage is not sufficient to prevent overcharging of individual cells. A lithium-ion battery does not have a characteristic voltage drop at high states of charge as a NIMH battery does. A typical lithium-ion battery voltage as a function of state of charge is shown in FIG. 4. It may be observed that the voltage generally increases as the state of charge increases. Consider a group of two battery cells, one having a high state of charge 92 and the other a low state of charge 94. The average of the two voltages will yield a SOC value between the two cell values. If an average value is used, the cell with the higher SOC may be become overcharged.

Knowing the individual cell voltage is also important for balancing the cells. Balancing the cells is a process of maintaining the cells at approximately the same state of charge or voltage. A cell may have additional circuitry to aid in balancing the cells. This is typically accomplished by having a switch in parallel to the battery cell to divert current flow around the battery cell. An important step in the process is to determine the state of charge of each battery cell. Once the state of charge of each battery cell is known, the switches may be activated in order to balance the cells to the same state of charge.

Without balancing, a cell with a high state of charge may control the charging of the battery pack. In order to prevent overcharging of the highest state of charge cell, other cells may not be charged to their full capacity. This means that the battery pack may not be storing as much energy as possible. Balancing allows all of the cells to be brought to the same state of charge level so that the energy stored in the battery pack can be optimized. Balancing may be performed at a predetermined SOC as multiple battery cells in a cluster may not necessarily have the same charge capacity.

Typical methods used for measuring cluster voltages may not be appropriate for lithium-ion cells since the average value is not sufficient to prevent overcharging of a cell. A more accurate means of determining the voltage of each individual cell may be necessary to effectively prevent cell overcharging. If a cluster voltage measurement is to be used, a method for effectively calculating the attributes of each cell must be implemented.

Figure 5:
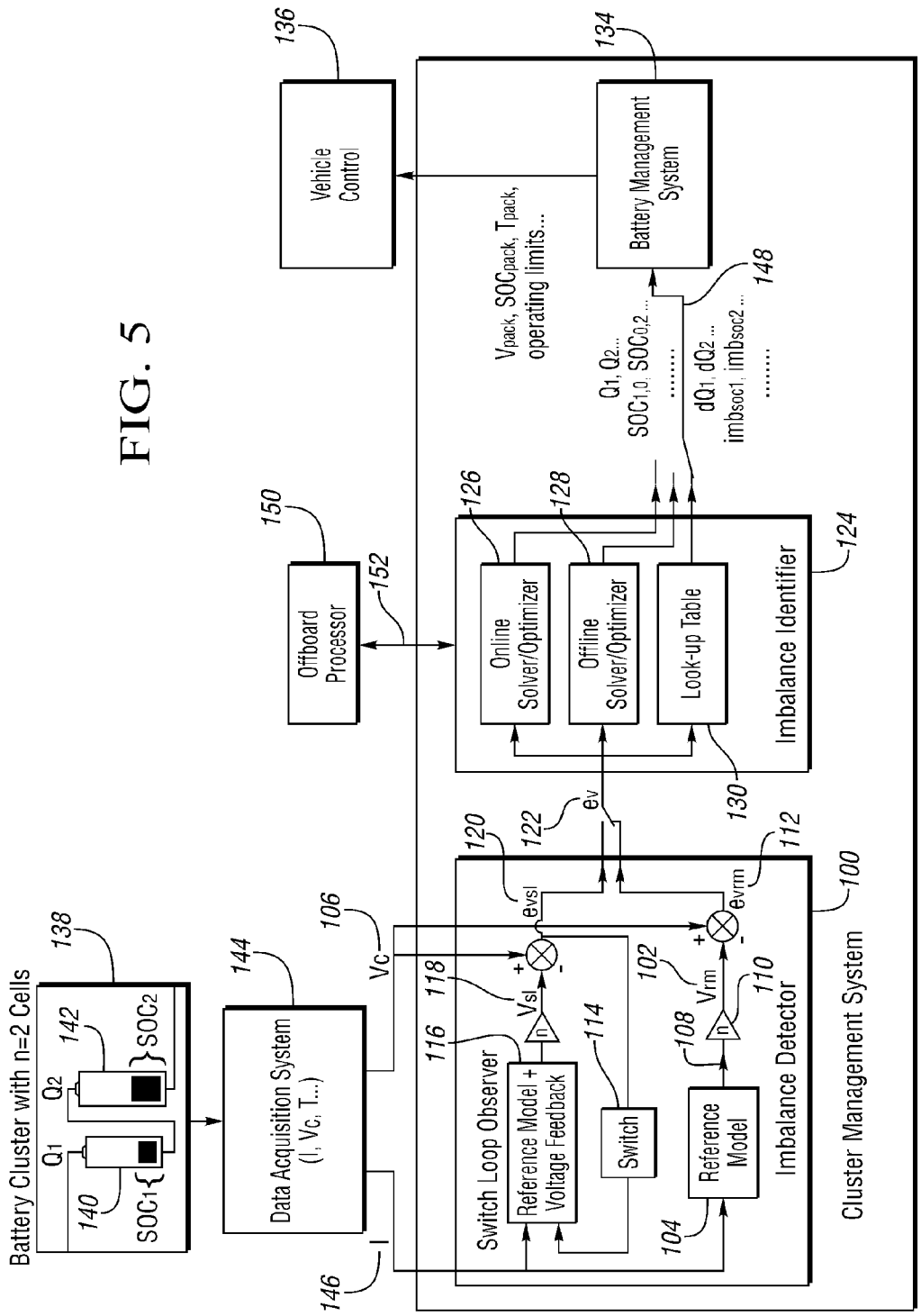
FIG. 5 is a diagram of one possible embodiment for detecting and processing an imbalance within a battery cluster.

FIG. 5 illustrates a possible architecture for processing cluster voltages to determine suitable cell values for vehicle control. The architecture considers a cluster of n battery cells 138. Each cell may have a different state of charge (SOC) and/or a different charge capacity (Q). FIG. 5 shows a group or cluster 138 comprised of two representative cells 140 and 142. The number of cells in a cluster or group is not limited to two. The first cell 140 may have a charge capacity of Q1 and a state of charge of SOC1 while the second cell may have a charge capacity of Q2 and a state of charge of SOC2. In order to accurately characterize the battery pack, it may be desirable to determine the individual properties of each cell (140, 142) within the cluster 138.

Various measurements from each cluster 138 may be processed by a data acquisition system (DAS) 144. The DAS 144 may be a stand-alone module and may include the sensor modules (34 FIG. 2). The DAS 144 function may also be incorporated into a controller such as the BCM (36 FIG. 2). The DAS 144 portion of the system may measure cluster properties such as current, voltage and temperature. The DAS 144 may contain any filtering and conditioning circuitry necessary to isolate and scale the measurement signals. The DAS 144 may then distribute or communicate the cluster property values for other functions or modules to use. The DAS 144 may be implemented as one or more controllers. The DAS 144 may measure and transmit such properties as voltage 106 and current 146.

An imbalance detector 100 may be implemented in order to predict when an imbalance between cells of a group exists. The imbalance detector 100 may predict an overall voltage of the battery cluster, $V_{rm}$ 102, based on a reference model 104. An imbalance may be detected by comparing the voltage prediction 102 to a measured cluster voltage, $V_c$ 106. The voltage prediction 102 may be an expected value of the actual voltage. The reference model 104 may be a single cell battery model that uses predetermined values for the cell characteristics such as initial state of charge (SOC) and rated capacity. The reference model 104 may use a measured battery current 146 as an input. The reference model 104 may also use the amount of time the cells are charged or discharged to determine an expected voltage. The reference model 104 may be used to calculate the expected voltage of a single cell 108. A prediction of the overall cluster voltage 102 may be obtained by multiplying the number of cells per cluster 110 by the predicted cell voltage 108. The output of the reference model 104 may be considered an expected voltage of a group of battery cells. The reference model 104 is not limited to any specific model type. A variety of battery models may be considered including: an open-circuit voltage—resistance (OCV-R) model based on coulomb counting, a simplified equivalent circuit model, or electrochemical models that are specific to the individual cell.

The system may calculate the overall expected voltage 102 by calculating a representative model voltage 108 and multiplying by the number of cells in the group 110. Alternatively, if a voltage or state of charge is previously determined for each cell of the group, a model for each individual cell may be implemented using those already known values. The individual cell models may then be summed to obtain the cluster reference voltage 108. However, knowing accurate initial values for each cell is not required as the system described can, over time, determine any differences between the cell values.

Figure 3:
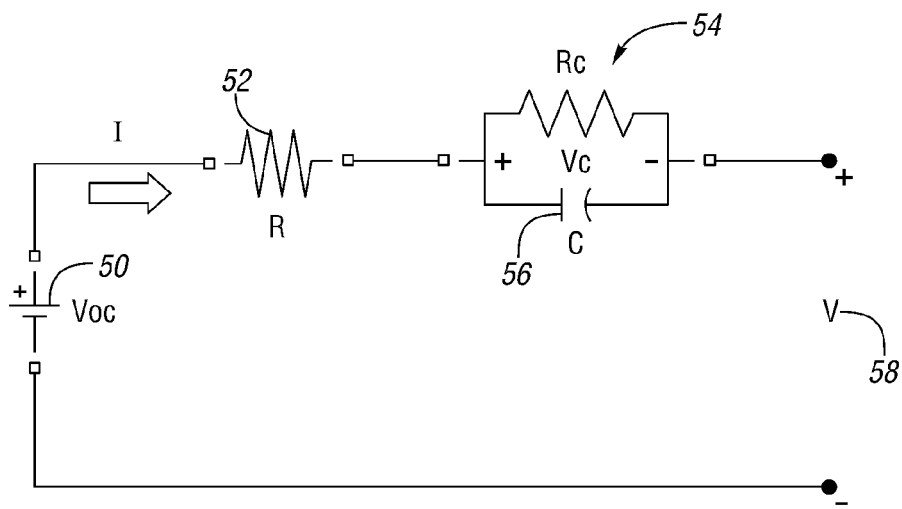
FIG. 3 is a diagram that illustrates an example of a battery cell equivalent circuit.

FIG. 3 shows a typical battery cell equivalent circuit model. A battery cell may be modeled as a voltage source ($V_{oc}$) 50 having associated resistances (52 and 54) and capacitance 56. Because of the battery cell impedance, the terminal voltage, V 58, is typically not the same as the open-circuit voltage, $V_{oc}$ 50. The open-circuit voltage, $V_{oc}$ 50, is not readily measurable as only the terminal voltage 58 of the battery cell is accessible for measurement. Since $V_{oc}$ 50 is not readily measurable, a model-based method may be used to estimate the value. The model may require that the values of resistance and capacitance be known or estimated. The battery cell model may depend on the battery pack chemistry. The particular model chosen for the battery cell is not critical to the method described and FIG. 3 represents only one possible example of a cell model.

For a typical Lithium-Ion battery cell, there is a relationship between SOC and the open-circuit voltage ($V_{oc}$) such that $V_{oc}=f(SOC)$. FIG. 4 shows a typical curve 96 showing the open-circuit voltage, $V_{oc}$, as a function of SOC. The relationship between SOC and $V_{oc}$ may be determined from an analysis of battery properties or from testing the battery cells. The function may be such that SOC may be calculated as $f^{-1}(V_{oc})$. The function or the inverse function may be implemented as a table lookup or an equivalent equation. The exact shape of the curve 96 may vary based on the exact formulation of the Lithium-Ion battery. The voltage, $V_{oc}$, changes as a result of charging and discharging of the battery.

Referring again to FIG. 5, a difference or error, $e_{vrm}$ 112, between the measured cluster voltage 106 and predicted or expected cluster voltage 102 may be calculated. A large error 112 between the expected voltage 102 and the measured voltage 106 may indicate an imbalance condition between the cells, 140 and 142, of that group 138. An imbalance condition may be detected when the characteristics of one or more cells deviates from the reference value 102. Small differences may be tolerated as they may be due to measurement accuracy or production tolerances.

The imbalance detection discussed so far has been performed using an open-loop model of the battery cells. The open-loop model described may not compensate for variations in model parameters or uncertainty in the initial values. In addition to the open-loop model, the imbalance detector may utilize a switch-loop architecture 114 for the reference voltage prediction. The switch loop 114 operates as a closed-loop observer and feeds an error signal, $e_{vsl}$ 120, back to the reference model 116 to compensate for any uncertainty in the initial state of charge (SOC) or other cluster properties. The switch loop 114 may be applied upon vehicle activation conditions to initialize the reference model 116. After a predetermined time period has expired or when the voltage prediction, $V_{sl}$ 118, has converged within a predetermined range of the measured voltage value 106, the voltage feedback may be switched out. An open-loop observer may then be used to calculate the cluster reference voltage 118. Under these open-loop conditions, any divergence of the predicted value 118 from the measured value 106 may be due to an imbalance in the characteristics among the cells.

When no imbalance condition is present, the measured voltage and the expected voltage values may track closely to one another. As the voltages change due to charging and discharging, the voltages should continue to track one another unless an imbalance condition is present. When the expected change in voltage varies from the measured change in voltage, an imbalance condition may be detected.

The two different imbalance detection structures (switch loop 116 and open-loop 104) may be employed at the same time. The output of the imbalance detector, $e_v$ 122, may be the error in voltage prediction of the reference model, $e_{vrm}$ 112, or the error in the voltage predicted by a switch loop observer, $e_{vsl}$ 120, or a weighted combination of the two.

The detected differential voltage, $e_v$ 122, may then be supplied to an imbalance identifier 124 to evaluate the amount of imbalance. The imbalance identifier 124 may identify the specific attributes or characteristics of each cell in a group 138 based on the detected imbalance. The deviation of relevant characteristics from predicted values may be calculated for each cell. The values of these relevant characteristics may also be calculated for each cell.

The imbalance identifier 124 may be able to obtain the imbalance in certain attributes of every single cell in the cluster 138. The cell attributes that may be estimated include SOC and charge capacity. The imbalance identifier 124 may identify an imbalance in SOC ($imb_{soc}$), that is, the deviation of each single cell SOC from the nominal SOC. The imbalance identifier 124 may also identify the ratio of each single cell capacity to the nominal capacity, $dQ_i$. It may be possible to determine other cell characteristics as well. The imbalance identifier may also calculate the cell attributes for each cell of the cluster.

Various methods may be adopted for the imbalance identification based on the error signal, $e_v$ 122. Some available configurations to identify the imbalance may be an online solver/optimizer 126, an offline solver/optimizer 128, a lookup table 130, or a combination online/offline, onboard solver/optimizer. Other methods may be possible and this list is not exhaustive. These methods are based on the fact that the imbalances may change slowly, except in the event of a sudden cell failure—which may be detected by existing methods.

One possible implementation of the imbalance identifier 124 may be an online solver/optimizer 126. With this option, equations or methods may be performed in real-time within a controller to determine the individual properties of each cell based on the imbalance. This embodiment may provide the most up-to-date values to the controller for use in the application. A given set of cells may be examined at a fixed interval. Depending on the processing power available, all of the clusters may be compared at once, or the solver may process one or more clusters on a rotating basis. For example, in a battery module with eighty cells with values measured two cells at a time, the imbalance of one set may be updated every 100 milliseconds and the imbalance of the entire battery can be checked in 4.0 seconds. The process may then be continually repeated over time.

Another possible implementation of the imbalance identifier 124 is to perform the calculations onboard the controller but while the system is offline. The controller may not have the processing capability to calculate the imbalance while the vehicle is operating, so an offline/onboard optimizer may be implemented. Data may be collected and saved to memory during operation and later processed by the controller when the vehicle is not running. This option may require the controller to have a keep-alive function to allow processing while the vehicle is not running. In the case of electric or plug-in hybrid vehicles, the controller may perform the processing while the vehicle is charging.

Another possible implementation for the imbalance identifier 124 is a combination onboard optimizer that may run online and offline. This alternative addresses the processing power of the offline solver/optimizer with the ability to protect the battery afforded by the online solver/optimizer. During normal operation, the offline method may be used. However, imbalances for the cell strings that appear to have the highest and lowest states of charge (not necessarily the highest or lowest combined voltage) may be checked on a continuous basis, with the processing spread out over more time. This alternative may identify a limited number of clusters to process online, while processing the other clusters offline. This method may be extended to a limited number of "highest" or a limited number of "lowest" cells. The cell strings to be checked may be based on the off-line estimation or by noting the behavior of the cell string voltages. Voltages that differ from the median by a significant amount or are moving away from the median may be selected for continuous monitoring. The determination of which cell string to process is currently used in NIMH vehicle batteries. To be conservative, the difference between the cluster voltage and the median voltage may be considered to be due to an imbalance in one cell of the cluster.

Another possible implementation is a complete offline/offboard solution. This may be useful when the onboard controller does not have the capability to calculate the imbalance while the vehicle is operating. The onboard controller may save sample data to memory while the vehicle is operating and then send the data on a periodic basis to an offboard processor 150. The offboard processor 150 may be a cloud-computing device. In this alternative, volatile memory may be used if the vehicle can communicate with the offboard processor 150 while driving, otherwise non-volatile memory may be required. When conditions are correct, the offboard processor 150 may update the imbalance and send the imbalance information back to the ECU. This solution allows the algorithm to be updated at any time and may allow for an onboard controller with less processing power. The communication link 152 between the onboard processor imbalance identifier 124 and the offboard processor 150 may be implemented in a variety ways. This communication link 152 may be based on cellular communications, satellite communication, or other vehicle wired/wireless interface. The communication link 152 is intended to include any necessary hardware and software necessary to implement such a link. Internet-to-vehicle technology is present art and there are vehicles in the market with this technology.

Another possible implementation is to use a lookup table 130 to determine the imbalance. A table of data may be stored in the controller that may be indexed by the imbalance, $e_v$ 122, to determine the particular characteristic value for each cell. The table may have additional dimensions such that other indices may be necessary. This alternative may utilize more memory space but may require less processing time.

The actual characteristic values for each cell may be obtained based on the identified imbalance 148. The battery management module 134 may have a series of single cell models for each cell and may apply the identified characteristics to each cell model to estimate the SOC and voltage of the cells. In this way, based on the overall voltage of the cluster, conditions of each individual cell may be calculated and monitored to prevent over-charge/discharge. The representative SOC, pack voltage, and pack operating limits may also be calculated and used for vehicle power management 136. The detected imbalance may also be used to perform cell balancing or for diagnostic purposes.

The following describes one possible implementation of the imbalance detection. For illustration, an implementation using a constant charging current as the input and adopting an OCV-R model as a reference model is described. A series lithium ion battery string with two cells will be described, although the methodology can be applied to battery clusters with more cells. The OCV-R model for a single cell takes the form:

$$\frac{dSOC}{dt} = \frac{I}{Q} \quad (1)$$

$$V = f_{OCV}(SOC) + IR \quad (2)$$

where I is the current, Q refers to the charge capacity, V represents the voltage, R is the internal resistance, and $f_{OCV}(x)$ represents the open circuit voltage of the battery which may be a nonlinear function of SOC (see FIG. 4). In this example, a $f_{OCV}(x)$ of a LiFePO$_4$ battery is used. The reference model is adopted as the imbalance detector directly. In this model, SOC may be calculated as a function of the charging and discharging current and the time the current is applied. Best results may be obtained for a constant current, but the disclosed system does not require this.

One case that may be considered is when there is only an imbalance in SOC between the cells in a cluster. Assume at the beginning of charging, Cell$_1$ has an initial SOC value of SOC$_{1,0}$ and Cell$_2$ has an initial SOC value of SOC$_{2,0}$. The imbalance (imb$_{SOC}$) in SOC between Cell$_1$ and Cell$_2$ may be calculated as the difference between SOC$_{2,0}$ and SOC$_{1,0}$ (e.g., SOC$_{2,0}$-SOC$_{1,0}$).

This imbalance, which may have resulted from long term operation under non-uniform conditions or cell degradation, is not likely to change during the short period when the imbalance estimation is being performed. Consequently, SOC$_2$ may be assumed to be equal to the sum of SOC$_1$ and imb$_{SOC}$. Without any knowledge of the actual values of SOC$_{1,0}$ and SOC$_{2,0}$, the reference model may assume an initial SOC of zero.

By solving Equations (1) and (2), the following equations result when the battery is charging under constant current:

$$SOC_1 = It/Q + SOC_{1,0} \quad (3)$$

$$V_1 = f_{OCV}(SOC_1) + IR = f_{OCV}(It/Q + SOC_{1,0}) + IR \quad (4)$$

$$SOC_2 = It/Q + SOC_{1,0} + imb_{SOC} \quad (5)$$

$$V_2 = f_{OCV}(SOC_2) + IR = f_{OCV}(It/Q + SOC_{1,0} + imb_{SOC}) + IR \quad (6)$$

$$SOC_r = It/Q + SOC_{r,0} \quad (7)$$

$$V_r = f_{OCV}(SOC_r) + IR = f_{OCV}(It/Q) + IR, \quad (8)$$

where t is the time elapsed, SOC$_{1/2}$ and V$_{1/2}$ represent the real SOCs and voltages of Cell$_1$ and Cell$_2$, SOC$_{x,0}$ represents the initial SOC value, and SOC$_r$ and V$_r$ represent the SOC and voltage prediction of the reference model.

The overall voltage of the cluster, V$_c$=V$_1$+V$_2$, may be measured, and the error between the measured voltage and the reference voltage, $e_v$, will be:

$$e_v = V_1 + V_2 - 2V_r \quad (9)$$

Incorporating equations (4), (6) and (8) into equation (9) yields:

$$e = f_{OCV}(It/Q + SOC_{1,0}) + f_{OCV}(It/Q + SOC_{1,0} + imb_{SOC}) - 2f_{OCV}(It/Q) \quad (10)$$

In equation (10), $e_v$, I, t, and $f_{OCV}(x)$ are known and the equation may be solved to find SOC$_{1,0}$ and imb$_{SOC}$. Since $f_{OCV}(x)$ is usually a nonlinear function of SOC, various nonlinear state estimation algorithms can be used to solve (10) for SOC$_{1,0}$ and imb$_{SOC}$. For example, a sequence of $e_v$, $e_{v,t1}$, $e_{v,t2}$, ..., $e_{v,tn}$, may be obtained at consecutive time instants t$_1$, t$_2$, ..., t$_n$. The Newton-Raphson algorithm may then be applied to find the values of SOC$_{1,0}$ and imb$_{SOC}$ that best fit the sequence. Other algorithms, including, but not limited to, a sliding mode observer and an unscented Kalman filter, may also be used to estimate the SOC imbalance online. The resulting $imb_{SOC}$ and $SOC_{1,0}$ values may then be applied to estimate the voltage and SOC for each cell in the cluster.

Another case that may be considered is when there is only an imbalance in charge capacity between the cells of a cluster. Each cell may have a nominal capacity of $Q_0$, but due to degradation or manufacturing variability, an individual cell may have a capacity different from the nominal capacity. Assume that the two cells have capacities of $Q_1$ and $Q_2$ respectively, and that $Q_1=Q_0*dQ_1$ and $Q_2=Q_0*dQ_2$. Under these circumstances, during constant current charging, the voltage difference between the measured cluster voltage and the predicted reference model voltage may be solved to be:

$$e_v = f_{OCV}(It/(Q_0*dQ_1)) + f_{OCV}(It/(Q_0*dQ_2)) - 2f_{OCV}(It/Q_0) \quad (11)$$

In equation (11), $e_v$, I, t, $Q_0$, and the OCV function are known and the equation may be solved to find $dQ_1$ and $dQ_2$. Since $f_{OCV}(x)$ is usually a nonlinear function of SOC, various nonlinear state estimation algorithms may be used to solve equation (11) for $dQ_1$ and $dQ_2$ as described previously. Over the entire charging process, numerous error, $e_v$, values can be acquired at different time instants and both $dQ_1$ and $dQ_2$ can be obtained by solving equation (11) with known $e_v$, I, t, and the OCV function using the collected error points. $Q_1$ and $Q_2$ can then be obtained based on $dQ_1$ and $dQ_2$, and may then be applied to estimate the voltage and SOC of each cell of the cluster. Error voltages may be collected over time and various methods may be used to solve for the unknowns as described earlier.

Another case that may be considered is when there is both an imbalance in SOC and an imbalance in capacity between cells of a cluster. This case is a combination of the previous two cases. By following the same derivation, $e_v$ can be obtained as:

$$e_v = f_{OCV}((It/(Q_0*dQ_1)) + SOC_{1,0}) + f_{OCV}((It/(Q_0*dQ_2)) + SOC_{1,0} + imb_{SOC}) - 2f_{OCV}(It/Q_0) \quad (12)$$

The error, $e_v$, may be different for different combinations of $SOC_{1,0}$, $imb_{SOC}$, $dQ_1$ and $dQ_2$. Over the entire charging process, numerous $e_v$ values may be acquired at different time instants and $SOC_{1,0}$, $imb_{SOC}$, $dQ_1$ and $dQ_2$ can be obtained by solving equation (12) with the known values of $e_v$, I, t, and $f_{OCV}(x)$ based on the collected error points. Once again, various nonlinear state estimation algorithms may be used to solve equation (12) for $SOC_{1,0}$, $imb_{SOC}$, $dQ_1$ and $dQ_2$ as described previously. The acquired $SOC_{1,0}$, $SOC_{2,0}$, $Q_1$ and $Q_2$ may then be applied to estimate the voltage and SOC of each individual cell in the cluster.

The imbalance identification may be most effective where there is a larger gradient in the voltage-SOC curve. Identification may be best achieved in those regions where the voltage changes more rapidly as a function of a change in SOC. For example, referring to FIG. 4, in the regions where SOC is above 80% or below 20%, the voltage has a larger gradient as a function of SOC. In these regions, the non-linear identification algorithms may be more effective in identifying the imbalance in values between the cells. To determine when to perform the imbalance identification, an average state of charge may be used. An average state of charge may be calculated based on the measured cluster voltage by using an average of the cluster voltage for the cell voltages. The state of charge and the charge capacity may then be estimated when the average state of charge of the cells within the group is within a predetermined range.

Knowing the imbalances and the properties for each cell, the system may control aspects of the battery pack operation. Knowing the SOC and charge capacity for each cell allows the cells to be balanced to optimize performance. In addition, knowing the SOC and charge capacity for each cell allows the controller to command proper charging and discharging of the battery pack. Charging may be commanded to ensure that the voltage of each cell in the group does not exceed a predetermined voltage to prevent over-voltage conditions. Discharging may be commanded to ensure that the voltage of each cell in a group does not fall below a predetermined voltage to prevent undervoltage conditions. The predetermined voltage for the overvoltage and undervoltage conditions may be a function of at least one of current and temperature.

Once the charge capacity and SOC for each cell are known, the SOC for the entire pack may be determined based on the individual cell values. The pack SOC may then be output to a driver display to inform the driver of the current state of the battery pack. The charge capacity information may be useful to aid in charging and discharging the battery pack.

Figure 6:
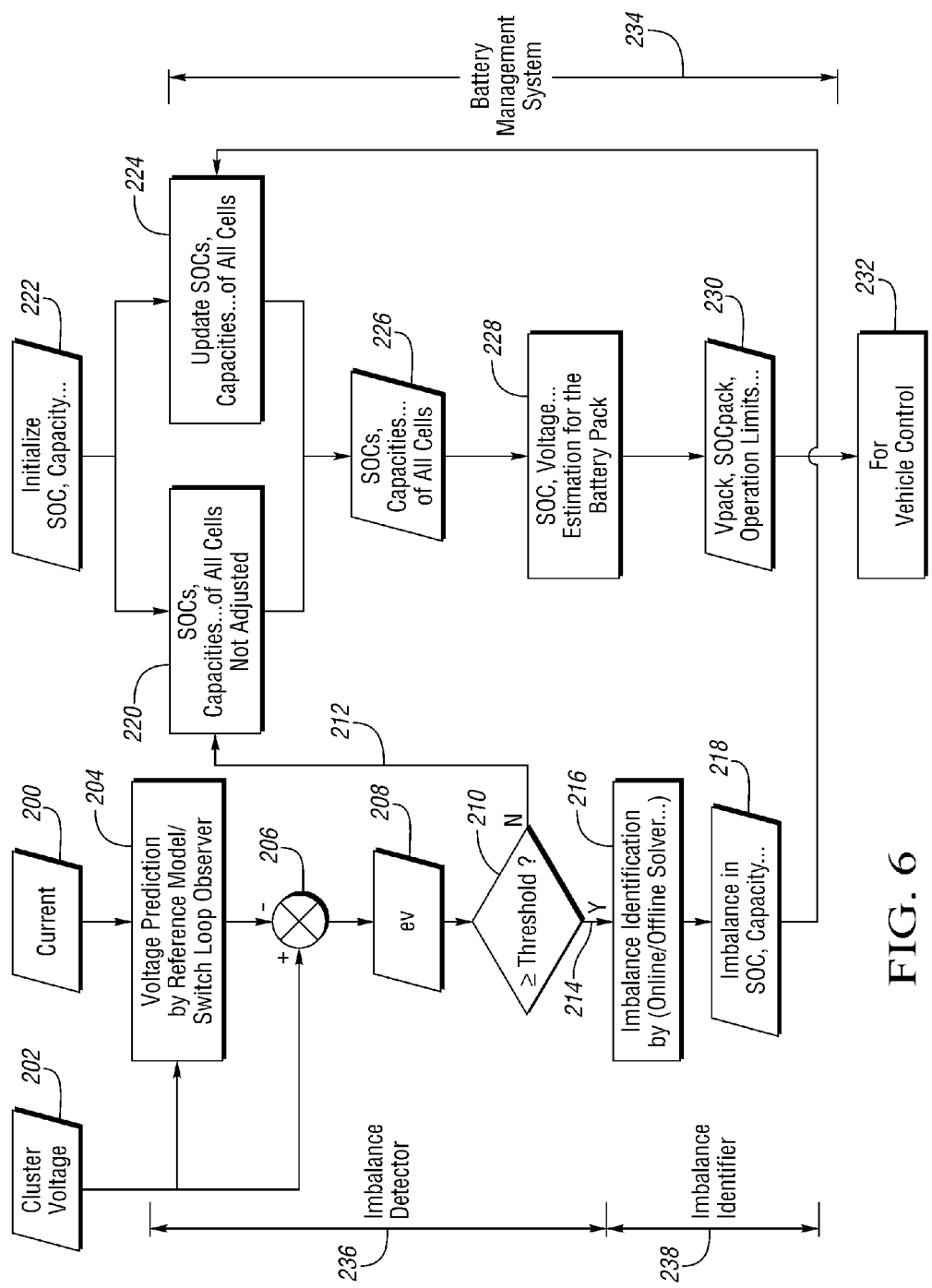
FIG. 6 is a flowchart illustrating one possible method for imbalance detection and identification.

FIG. 6 shows a flow chart of one possible embodiment that may be implemented as a method in one or more controllers. The system may be initialized with values for the SOC and charge capacity of each cell 222. These initialization values may be initial predictions or may be derived from previously stored values. During operation, the system must decide whether or not to update the cell SOC or charge capacity values.

The imbalance detector process 236 may receive a measured cluster voltage 202 and a measured current 200 as inputs. The imbalance detector process 236 may also monitor the charging and discharging time based on the measured current 200. These measured values may be input into a voltage prediction model 204 that uses a reference model that may incorporate a switch loop observer as previously discussed. The output of the voltage prediction model 204 may be subtracted 206 from the measured cluster voltage 202 to yield an error signal, $e_v$ 208. The error signal 208 may be stored for later use or transmitted to other functions. A comparison may be made with the error signal to determine if the magnitude is greater than a calibrateable threshold value 210. If the error signal magnitude is greater than the calibrateable threshold value 214 then an imbalance may be present. If the error signal magnitude is less than the calibrateable threshold value 212 then there may be no imbalance present.

If an imbalance is suspected 214, the imbalance identifier process 238 may be executed. The imbalance may be identified 216 by solving the previously presented equations for a sequence of error values. The imbalance may be identified 216 using any of the online or offline solution techniques outlined previously. The imbalance identifier 238 may then store or output the detected imbalance 218 for later use. The detected imbalance 218 may be provided to a battery management system 234. When an imbalance is detected, the capacity and SOC of the cells may be updated 224 according to the detected imbalance information.

When no imbalance is suspected 212, there may be no need to modify the SOC or capacity of the cells. In this case, no update is needed to the values due to an imbalance 220. The cell SOC or capacity values may be updated in their normal manner 226. These normal updates may be based on coulomb counting, for example. Once the SOC and charge capacity values are known for each cell of the pack, the SOC and voltage for the entire pack may be calculated 228. Once the pack values are calculated, the battery operation limits may be calculated 230. The operating limits may be used for vehicle control 232. The battery operation limits may prevent the vehicle controls from operating in a way that may negatively impact the battery pack. This includes charging and discharging of the battery pack based on the calculated operation limits. The operating limits may also provide feedback to the driver of the status of the vehicle or battery pack.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a plurality of battery cells arranged into groups of at least two cells in series; and
   a controller programmed to balance at least some of the cells in response to a change in voltage, caused by charging and discharging the cells, measured across one of the groups being at least a predetermined amount different than an expected change in voltage that is based on a current and time associated with the charging and discharging.

2. The vehicle of claim 1 wherein the expected change in voltage is further based on a measured voltage across the one of the groups.

3. The vehicle of claim 1 wherein the cells are charged and discharged at a generally constant current.

4. The vehicle of claim 1 wherein the battery cells are lithium based.

5. A vehicle comprising:
   a plurality of battery cells arranged into groups of at least two cells in series; and
   a controller programmed to command charging and discharging of the battery cells within one of the groups based on a difference between a measured voltage across the one of the groups and an expected voltage for the one of the groups that is based on a current and time associated with the charging and discharging.

6. The vehicle of claim 5 wherein the charging is commanded such that the voltage of each cell in the one of the groups does not exceed a predetermined voltage.

7. The vehicle of claim 5 wherein the discharging is commanded such that the voltage of each cell in the one of the groups remains above a predetermined voltage.

8. The vehicle of claim 5 wherein the expected voltage is further based on a value of the measured voltage across the one of the groups during a predetermined period of time beginning with vehicle activation.

9. The vehicle of claim 5 wherein the cells are charged and discharged at a generally constant current.

10. The vehicle of claim 5 wherein the charging and discharging is further based on an estimate of at least one of a state of charge and a charge capacity for the cells within the one of the groups calculated from the difference between the voltage across the one of the groups and the expected voltage for the one of the groups.

11. The vehicle of claim 10 wherein the one of the state of charge and the charge capacity is estimated when an average state of charge of the cells within the one of the groups is within a predetermined range.

12. The vehicle of claim 5 wherein the battery cells are lithium based.

13. A method for balancing cells of a battery pack comprising:
    measuring a voltage across a group of cells in series;
    estimating an imbalance in a cell attribute between the cells of the group in response to a difference between the voltage and an expected voltage, based on a current and time associated with charging and discharging the cells, exceeding a predetermined magnitude; and
    charging and discharging the cells in response to estimating the imbalance.

14. The method of claim 13 wherein the expected voltage is further based on a value of the measured voltage during a predetermined period of time beginning with vehicle activation.

15. The method of claim 13 wherein the expected voltage is further based on a value of the measured voltage during a period of time beginning with vehicle activation and ending when the difference between the value of the voltage and the expected voltage becomes less than a predetermined value.

16. The method of claim 13 wherein the cell attribute is a state of charge.

17. The method of claim 13 wherein the cell attribute is estimated for each of the cells of the group.

18. The method of claim 13 wherein the cell attribute is a charge capacity.

* * * * *